United States Patent
Hikmet

(10) Patent No.: US 12,134,225 B2
(45) Date of Patent: Nov. 5, 2024

(54) METHOD FOR 3D PRINTING A 3D ITEM

(71) Applicant: SIGNIFY HOLDING B.V., Eindhoven (NL)

(72) Inventor: Rifat Ata Mustafa Hikmet, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 271 days.

(21) Appl. No.: 16/500,348

(22) PCT Filed: Apr. 9, 2018

(86) PCT No.: PCT/EP2018/058952
§ 371 (c)(1),
(2) Date: Oct. 2, 2019

(87) PCT Pub. No.: WO2018/189062
PCT Pub. Date: Oct. 18, 2018

(65) Prior Publication Data
US 2021/0101330 A1    Apr. 8, 2021

(30) Foreign Application Priority Data

Apr. 13, 2017 (EP) ..................... 17166399

(51) Int. Cl.
B29C 64/118 (2017.01)
B29C 64/209 (2017.01)
B29C 64/336 (2017.01)
B33Y 10/00 (2015.01)
B33Y 30/00 (2015.01)
B33Y 70/10 (2020.01)
B29K 105/08 (2006.01)
B29K 309/08 (2006.01)

(52) U.S. Cl.
CPC .......... *B29C 64/118* (2017.08); *B29C 64/209* (2017.08); *B29C 64/336* (2017.08); *B33Y 10/00* (2014.12); *B33Y 30/00* (2014.12); *B33Y 70/10* (2020.01); *B29K 2105/08* (2013.01); *B29K 2309/08* (2013.01)

(58) Field of Classification Search
CPC ..... B29C 64/10; B29C 64/118; B29C 64/209; B29C 64/336
See application file for complete search history.

(56) References Cited

U.S. PATENT DOCUMENTS 2,250,610 A * 7/1941 Simons ..................... B21C 1/04
                                                          72/289
5,936,861 A   8/1999 Jang et al.
9,126,365 B1 * 9/2015 Mark .................... B29C 31/042
(Continued)

FOREIGN PATENT DOCUMENTS

CN          1379258 A      11/2002
CN        101258359 A       9/2008
(Continued)

*Primary Examiner* — Andrew D Graham

(57) ABSTRACT

The invention provides a method comprising 3D printing a 3D item (1), the method comprising co-depositing during a printing stage 3D printable material (201) and an elongated solid fiber (310) with a fused deposition modeling 3D printer (500) via a single nozzle (502), to provide the 3D item (1) comprising 3D printed material (202) with the elongated solid fiber (310) embedded therein.

6 Claims, 4 Drawing Sheets

(56) References Cited

U.S. PATENT DOCUMENTS

| | | | |
|---|---|---|---|
| 10,562,226 B1* | 2/2020 | Cohen | B29C 48/05 |
| 2003/0044593 A1* | 3/2003 | Vaidyanathan | C04B 35/584 |
| | | | 428/297.4 |
| 2011/0076496 A1* | 3/2011 | Batchelder | B29C 64/106 |
| | | | 428/373 |
| 2014/0061974 A1 | 3/2014 | Tyler | |
| 2014/0232035 A1* | 8/2014 | Bheda | B29C 64/165 |
| | | | 425/375 |
| 2014/0291886 A1* | 10/2014 | Mark | B29B 15/14 |
| | | | 264/259 |
| 2014/0328963 A1* | 11/2014 | Mark | B29C 64/209 |
| | | | 425/143 |
| 2014/0328964 A1* | 11/2014 | Mark | B29C 64/393 |
| | | | 425/166 |
| 2014/0353878 A1* | 12/2014 | Driessen | B29C 64/135 |
| | | | 264/401 |
| 2014/0361460 A1* | 12/2014 | Mark | B29C 70/521 |
| | | | 264/248 |
| 2015/0108677 A1* | 4/2015 | Mark | B29C 64/30 |
| | | | 264/138 |
| 2015/0165666 A1* | 6/2015 | Butcher | B29C 64/165 |
| | | | 428/373 |
| 2015/0290875 A1* | 10/2015 | Mark | B33Y 70/00 |
| | | | 264/138 |
| 2015/0367576 A1 | 12/2015 | Page | |
| 2016/0012935 A1 | 1/2016 | Rothfuss | |
| 2016/0107379 A1* | 4/2016 | Mark | G05B 19/4099 |
| | | | 264/308 |
| 2016/0114532 A1* | 4/2016 | Schirtzinger | B29C 64/147 |
| | | | 428/411.1 |
| 2016/0136887 A1* | 5/2016 | Guillemette | B29C 64/106 |
| | | | 428/375 |
| 2016/0198576 A1* | 7/2016 | Lewis | H01L 24/75 |
| | | | 361/761 |
| 2016/0207220 A1* | 7/2016 | Hack | B25J 5/005 |
| 2016/0297104 A1* | 10/2016 | Guillemette | B29B 11/16 |
| 2016/0311165 A1* | 10/2016 | Mark | B29C 64/393 |
| 2016/0325491 A1* | 11/2016 | Sweeney | B29C 64/264 |
| 2017/0173868 A1* | 6/2017 | Mark | B29C 64/106 |
| 2017/0232674 A1* | 8/2017 | Mark | B33Y 30/00 |
| | | | 264/308 |
| 2017/0268133 A1* | 9/2017 | Graley | B33Y 80/00 |
| 2018/0036946 A1* | 2/2018 | Barton | B29C 64/118 |
| 2018/0202076 A1* | 7/2018 | Van Der Schaaf | C04B 35/111 |
| 2018/0345597 A1* | 12/2018 | Wilenski | B33Y 70/00 |
| 2019/0009462 A1* | 1/2019 | Wilenski | B29C 64/209 |
| 2019/0084243 A1* | 3/2019 | Wilenski | B29C 64/118 |
| 2020/0361138 A1* | 11/2020 | De Jong | B33Y 30/00 |
| 2021/0101330 A1* | 4/2021 | Hikmet | B33Y 80/00 |

FOREIGN PATENT DOCUMENTS

| | | |
|---|---|---|
| CN | 105339154 A | 2/2016 |
| CN | 106313496 A | 1/2017 |
| JP | H06254852 A | 9/1994 |
| JP | 2017071101 A | 4/2017 |
| WO | 2014153535 A2 | 9/2014 |
| WO | 2015182675 A1 | 12/2015 |

* cited by examiner

METHOD FOR 3D PRINTING A 3D ITEM

CROSS-REFERENCE TO PRIOR APPLICATIONS

This application is the U.S. National Phase application under 35 U.S.C. § 371 of International Application No. PCT/EP2018/058952, filed on Apr. 9, 2018, which claims the benefit of European Patent Application No. 17166399.0, filed on Apr. 13, 2017. These applications are hereby incorporated by reference herein.

FIELD OF THE INVENTION

The invention relates to a method for manufacturing a 3D (printed) item. Yet further, the invention also relates to a 3D printer, and to a computer program product comprising instructions which, when the computer program product is executed by the 3D printer, cause the 3D printer to carry out the method.

BACKGROUND OF THE INVENTION

Systems for composite part fabrication are known in the art. US 2015/0367576, for instance, describes amongst others a method including providing a matrix material and a fiber material separate from the matrix material to a fused deposition modelling (FDM) three dimensional (3D) printer, and delivering the matrix material and the fiber material to a printing location of the FDM 3D printer while maintaining separation of the fiber material from the matrix material up to the printing location of the FDM 3D printer, wherein the delivering includes melting the matrix material and embedding the fiber material within the matrix material. A tube of matrix material can be a hollow thermoplastic filament. A fiber bundle can run through the center of the matrix material tube. For example, the fiber bundle consists of structural fibers in the center of a hollow thermoplastic filament. In some implementations, these structural fibers are not continuous, but are composed of fibers between 3-25 mm long each. In some cases, structural fibers can be a woven mat or strip of woven fabric, or composed of discontinuous patches. Further, a system of US 2015/0367576 includes a build platform; and two or more tools associated with the build platform; wherein the two or more tools are configured and arranged with respect to the build platform to add matrix material and fiber material in non-planar layers to build the object.

US 2014/061974 discloses a method and apparatus for the additive manufacturing of three-dimensional objects. Two or more materials are extruded simultaneously as a composite, with at least one material in liquid form and at least one material in a solid continuous strand completely encased within the liquid material. A means of curing the liquid material after extrusion hardens the composite. The strand material within the composite contains specific chemical, mechanical, or electrical characteristics that instill the object with enhanced capabilities not possible with only one material.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast and can be used for printing complicated object.

FDM printers are relatively fast, low cost and can be used for printing complicated 3D objects. Such printers are used in printing various shapes using various polymers. The technique is also being further developed in the production of LED luminaires and lighting solutions.

Problems with prior art solutions may be that they do not provide an introduction of relative long fibers of solid material in the filaments. This may however be desired for e.g. electrical connections or optical connections, etc. Further, it appears that when prior art methods for 3D printing are applied, and simply an elongated fiber is introduced in the printing process, problems are encountered. For instance, for thicker fibers it appears that when making e.g. turns with the printer head, a torque is applied on the fiber and the fiber is pulled out of the layers wherein the fiber should be embedded, protruding of fibers from the 3D printed item, etc.

Hence, it is an object of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative.

Amongst others, we herein suggest a method for printing continuous solid fibers, such as fibers optics, a carbon fiber, conductive wires, etc., using a FDM printer (where the printer head moves in XY plane while the platform moves in the Z direction) and a feeder is used to push a polymer to the printer head where the polymer melts and flows out the nozzle. In such a printer, the solid fiber can be fed into the nozzle together with the polymer. It was surprisingly found that when the fiber is thin enough, no extra feeder is needed for pushing the solid fiber and it is pulled out of the nozzle during the printing. For thicker fibers, it may be desirable to feed the fiber using a separate feeder. It was also found that during the printing the solid fiber may become twisted and this twisting action may prevent the filament following the path of the nozzle.

It was surprisingly found that when relatively thin (about <0.5 mm) fibers were used the stress caused by twisting action could be absorbed. Furthermore the filament could be pulled out of the nozzle without a separate feeder for the solid fiber.

It was also surprisingly found that the easiest way for printing relatively thin solid fiber was by feeding it through a hole having the size of the fiber in the side wall of the printing nozzle.

When a relatively thick (>0.5 mm) fiber is used it is suggested herein to use a printer with a separate feeder for the fiber. In specific embodiments, it is herein further suggested rotating the solid fiber carrier in a synchronized manner with the movement of the printer head in order to avoid/reduce the twisting of the fiber during printing.

Therefore, in a first aspect the invention provides a method for 3D printing a 3D item ("item") using a fused deposition modeling 3D printer ("printer" or "FDM printer"). The method comprises the steps of (i) feeding a 3D printable material to a printer nozzle of the fused deposition modeling 3D printer, (ii) providing, with a fiber providing unit, an elongated solid fiber to the printer nozzle, and (iii) co-depositing, during a printing stage, the 3D printable material and the elongated solid fiber ("fiber" or "elongated fiber" or "solid fiber", or in embodiments a bundle of fibers), via the printer nozzle, to provide the 3D item comprising 3D printed material with the elongated solid fiber embedded therein.

The fiber providing unit is further configured to control a rotation of the elongated solid fiber provided to the printer nozzle around an axis of elongation of the elongated solid fiber. The method further comprises the step of controlling rotation of the elongated solid fiber when the elongated solid fiber has a diameter of at least 0.5 mm.

With such method, it appears to be possible to embed long fibers in the 3D printed layers in a stable and enduring way. Even relatively thick fibers may be embedded. With the presently described method, such fibers may be used for optical applications (wave guiding or light guiding) or for electrical purposes, such as as electrical conductors for providing power to an electrical component, such as a light source.

As indicated above, the invention provides amongst others a method comprising 3D printing a 3D item. Hence, the invention provides a 3D printing method, especially a FDM printing method.

The (with the herein described method) obtained 3D printed item may be functional per se. The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light source (like a LED), etc. The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. Alternatively, or additionally, the functional component may comprise a thermal component (e.g. configured to cool or to heat an electrical component). Hence, the functional component may be configured to generate heat or to scavenge heat, etc.

For instance, in embodiments the elongated fiber may functionally be coupled with a light source or other electrical component. For instance, in embodiments the elongated solid fiber comprises an electrically conductive material, such as a carbon fiber or a copper fiber. Such elongated fiber may be used to provide electrical power to an electrical component. In yet other embodiments, the elongated fiber may functionally be coupled with light source for wave guiding purposes. Hence, in specific embodiments the elongated solid fiber comprises a light guide material. The fiber may be used for guiding visible light or other types of light. The fiber may be used for communication purposes, etc. etc.

The functional component, such as an electrical component, as mentioned above, may be part of the 3D item, such as at least partly embedded therein, or may not be part of the 3D item. In the later situation, a 3D item and such functional component may functionally be coupled (by e.g. a user).

For instance, in embodiments the elongated solid fiber comprises a glass material. Such glass fibers can be used as light guides. They may also have a cladding layer. They may be made of materials such as silica, fluorozirconate, fluoroaluminate, and chalcogenide glasses. They may have step refractive index, gradient refractive index. It may also be made of plastic fiber such as PMMA, silicone rubber etc.

The fiber can have also mechanical and/or decorative functions. It can be a polymeric fiber such as para-aramid synthetic fiber, such as Kevlar, a polyamide fiber and a polyester fiber. Hence, in embodiments the elongated solid fiber may comprise a polymeric material or carbon material, etc.

The term "solid fiber" especially relates to a material that is solid at a glass and/or melting temperature of the thermoplastic material that may especially be applied in the fused deposition printing stage. This may especially apply to glass material or carbon fibers. Hence, during printing the solid filament does essentially not melt or get soft (like this may apply to the 3D printable material), but stays solid.

The term fiber may also refer to a core-shell fiber, such as e.g. an optical fiber including a cladding, or an electrically conductive wire including an insulator. Hence, the term "fiber" may essentially refer to any relatively long and thin, i.e. elongated wire-like element. For instance, the aspect ratio (of the length and a diameter) may in embodiments be equal to or larger than 10, such as equal to or larger than 100, or equal to or larger than 1000, or even larger aspect ratios are possible.

Note that more than one fiber may be present in the final 3D printed item. Hence, different fibers may be available with different functions. Hence, the term "fiber" may also refer to a plurality of fibers. Hence, the term "fiber" may also refer to a bundle fibers, such as a bundle of essentially the same fibers or a bundle of a plurality of different fibers.

The fibers may have a thickness or diameter in the range of about 0.05-5 mm, such as 0.1-2 mm. The fibers do not necessarily have a circular cross-section. However, when the cross-section is non-circular a shortest dimension and longest dimension do not differ much. For instance, an aspect ratio between a smallest thickness and a largest thickness may be selected from the range of 0.5-2. Hence, effectively the fibers may essentially have a circular cross-section. The thickness or diameter may also be indicated as equivalent diameter or equivalent circular diameter. The equivalent circular diameter (or ECD) of an irregularly shaped two-dimensional shape is the diameter of a circle of equivalent area. For instance, the equivalent circular diameter of a square with side a is $2*a*SQRT(1/\pi)$.

As indicated above, the term "fiber" may also refer to a bundle of fibers. In such instance, for the purpose of thickness, diameter and length, to a bundle of fibers will be referred to as fiber.

The fiber may in embodiments e.g. have a length of at least about 0.5 cm, such as at least about 1 cm, like at least about 2 cm, such as at least about 2.5 cm, such as at least about 5 cm, such as selected from the range of 5-100 cm, or even more, such as at least about 10 cm, up to e.g. several meters, like up to 2 or even 5 meters. Hence, in specific embodiments the elongated solid fiber has a length (l) of at least 5 cm. Note that in embodiments two or more fibers may be available, which may have different lengths.

Further, the method of the invention includes co-depositing during a printing stage (a) 3D printable material and (b) an elongated solid fiber with a fused deposition modeling 3D printer via a single nozzle. Hence, both the fiber and the 3D printable material escape from the same nozzle and are deposited. Hence, both are provided through the same single opening.

Note that the term "single nozzle" does not preclude that a printer may be used with more than one printer head, and thus more than one nozzle. However, in the method of the invention during the printing stage the co-depositing is executed with a nozzle through which both the 3D printable material and the fiber are guided.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former.

As indicated above, the invention thus provides a method comprising providing a filament of 3D printable material and printing during a printing stage said 3D printable material on a substrate, to provide said 3D item. Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polystyrene (PS), PE (such as expanded-high impact-Polythene (or polyethene), Low density (LDPE) High density (HDPE)), PVC (polyvinyl chloride) Polychloroethene, etc. Optionally, the 3D printable material comprises a 3D printable material selected from the group consisting of Urea formaldehyde, Polyester resin, Epoxy resin, Melamine formaldehyde, Polycarbonate (PC), thermoplastic elastomer, etc. Optionally, the 3D printable material comprises a 3D printable material selected from the group consisting of a polysulfone.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

In this way, the 3D item is provided comprising 3D printed material with the elongated solid fiber embedded therein. The 3D printed item may basically include a layered structure, based on the additive process of deposition of filament on filament. At least part of such layers will include the fiber, with the fiber embedded in the layer(s). Hence, over essentially the entire length of the fiber the fiber is embedded in the former filaments, which are now layers in the ready 3D printed item; see further also below. Of course, not all layers or former filaments necessarily include the fiber or fibers.

When fibers are deposited, problems may arise when the printer head makes turns. The filament may relatively easily follow essentially any angle or curve, but the fiber may be less flexible. The present invention solves such problem by providing a unit that allows rotation of the fiber around its axis of elongation. The term "rotation" may refer to any rotational angle (or "angle of rotation") larger than 0°. Of course, this may be a rotation counterclockwise or clockwise. This may depend upon the angle or curve the printer head makes.

The method comprises feeding 3D printable material to the printer nozzle and providing with a fiber providing unit the elongated solid fiber to the printer nozzle, wherein the fiber providing unit is further configured to control a rotation of the elongated solid fiber provided to the printer nozzle around an axis (C1) of elongation of the elongated solid fiber. In this way, it is possible to compensate for a torque on the elongated solid fiber during the printing stage, when making e.g. a turn. The fiber providing unit may be attached to the printer head or may be separate thereof. The printer, however, is configured such that the fiber providing unit can follow the printer head and can impose a rotation on the fiber for compensating for a turn (curve or angle), when considered necessary. The fiber providing unit may consist of several elements, of which one or more may be rotatable. Hence, in embodiments at least part of the fiber providing unit may rotate and/or translate relative to the printer nozzle. For instance, the fiber providing unit may comprise a rotatable and/or translatable head. Especially, the part may at least be rotatable, such as a rotatable head. In further specific embodiments, the head is translatable and rotatable. Therefore, in embodiments at least part of the fiber providing unit, such as e.g. at least a head thereof, may configured to move in a synchronized manner with the movement of the printer head for avoiding or reducing the twisting of the fiber during printing.

As indicated above, for thin fibers the torque may be small, and may be compensated for by the fiber. For thicker fibers, sharp curves may lead to torques on the fiber which may bring tension in the 3D printed product, or already during printing. It was found that the height of the deposited layers, herein also indicated with reference t, may especially be 1.5 times larger than the fiber diameter (d) (t>1.5d). The width, herein also indicated with reference w, of the deposited fiber may especially be larger than 2 times of the diameter of the fiber (w>2d).

The method further comprises controlling rotation of the elongated solid fiber when the elongated solid fiber has a diameter d of at least 0.5 mm. In this way, during the printing stage a torque on the elongated solid fiber may be compensated. Of course, when desired, for thinner fibers also rotation may be controlled, such as fibers having a diameter of at least 0.2 mm. However, in yet other embodiments no compensation may be executed when the elongated solid fiber has a diameter of less than 0.5 mm. As indicated above, in embodiments the term "diameter" may refer to equivalent diameter when the fiber has no essentially circular cross-section.

It further appears that best results may be obtained when the layer height (of the 3D printed product, i.e. of the former filaments) and/or the layer width are substantially larger than the diameter of the fiber. Therefore, in specific embodiments the elongated solid fiber has a diameter d, wherein the method further comprises controlling during deposition a layer height (t) of the 3D printed material at at least 1.5*d, and/or controlling during deposition a layer width (w) of the 3D printed material at at least 2*d. Note that here is referred to the 3D printed layers. The filament, escaping from the nozzle may have a diameter of at least about 1.75*d.

Creating layers having a non-circular cross-section may e.g. be obtained by adjusting the distance between the printed layer and the printer nozzle to be smaller than the diameter of the orifice of the nozzle. It is also possible to change the layer thickness during the printing.

Optionally, a cutter can be included for cutting the fiber at desired places. Hence, in embodiments the printer may also include a cutter, configured to cut the fiber. This may imply a (temporary) stopping of introduction of the fiber to the printer head (see also below). Furthermore during printing at sections where no fiber is desired a break can be used to stop the fiber pulled out by the viscous action of the flowing polymer. This way an object can be produced with sections containing no fibers. In this way, also circuits can be produced where electrical components can be placed.

The fiber may be fed together with the 3D printable material to a single (top) opening in the printer head. Optionally, different openings are used to introduce the fiber and the printable material to the printer head. In specific embodiments, the fiber may be fed sideways to the printer head (see also below).

The herein described method provides 3D printed items. A 3D printed item obtainable with the herein described method comprises deposited layers, wherein the layers comprise 3D printed material comprising polymeric material, wherein the layers further comprise an elongated solid fiber embedded in the 3D printed material, wherein the layers in specific embodiments have a layer height (t) of at least 1.5*d and/or wherein the layers in specific embodiments have a layer width (w) of at least 2*d, wherein d is a diameter of the elongated solid fiber. Note that different layers may optionally have different heights or widths. Alternatively or additionally, fibers vary in diameter over their length and/or different fibers (when available) may have different diameters.

As indicated above, the elongated solid fiber may comprise one or more of an electrically conductive material and a light guide material. For instance, the elongated solid fiber comprises a glass material. Especially, the elongated solid fiber has a length (l) of at least 5 cm.

The 3D printed item may be used as such or may be part of a larger device or system. An example of the latter is a lighting system comprising (a) a light source configured to provide (visible) light source light and (b) a 3D item obtainable with the herein described method, wherein the elongated solid fiber is configured as electrical conductor functionally coupled to the light source (for providing electrical power) or as optical fiber configured to receive light source light from said light source and to light guide the light source light over at least part of a length (L) of the optical fiber.

Returning to the 3D printing process, a specific 3D printer may be used to provide the 3D printed item described herein.

Therefore, in a second aspect the invention also provides a fused deposition modeling 3D printer for providing a 3D printable material to a substrate. The fused deposition modeling 3D printer comprises a printer head comprising a printer nozzle, and a 3D printable material providing device configured to provide the 3D printable material to the printer head. The 3D printable material providing device may provide a filament comprising 3D printable material to the printer head or may provide the 3D printable material as such, with the printer head creating the filament comprising 3D printable material. Hence, in an aspect the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate.

The fused deposition modeling 3D printer further comprises a fiber providing unit for providing an elongated solid fiber to the printer head, wherein the fused deposition modeling 3D printer is configured to co-deposit, during a printing stage, the 3D printable material and the elongated solid fiber via the printer nozzle.

The fiber providing unit is configured to control a rotation of the elongated solid fiber provided to the printer nozzle around an axis (C1) of elongation of the elongated solid fiber, such as especially for compensating a torque on the elongated solid fiber during the printing stage.

The fused deposition modeling 3D printer further comprises a control system (C), wherein the control system (C) is configured to control rotation of the elongated solid fiber when the elongated solid fiber has a diameter of at least 0.5 mm. In embodiments, no compensation is executed when the elongated solid fiber has a diameter of less than 0.5 mm. Here, the term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element.

In embodiments, the invention provides such fused deposition modeling 3D printer, wherein the fiber providing unit is further configured to introduce the elongated solid fiber via a side inlet of the printer head to the printer nozzle, and wherein 3D printable material providing device is configured to provide the 3D printable material to a top inlet of the printer head. Such 3D printer may especially be used for incorporation of thinner fibers, such as having a diameter of at maximum 0.5 mm.

In yet further specific embodiments, the fused deposition modeling 3D printer as defined herein further comprises a control system, wherein the control system may in embodiments be configured to control (during deposition) a layer height (t) of the 3D printed material which is at least 1.5*d, wherein d is a diameter of the elongated solid fiber. Further, in embodiments the control system may be configured to control (during deposition) a layer width (w) of the 3D printed material which is at least 2*d, wherein d is a diameter of the elongated solid fiber. As indicated above, the control system may in embodiments be configured to control (during deposition) rotation of the elongated solid fiber, especially when the elongated solid fiber has a diameter of at least 0.5 mm. Therefore, in specific embodiments the control system may in embodiments be configured to control (during deposition) a fiber providing unit, such as a rotatable and/or translatable head thereof.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

In a third aspect, the invention provides a software product that can be used to execute the method described herein. The software product may be a computer program product comprising instructions which, when the computer program product is executed by the fused deposition modeling 3D printer according to the second aspect, cause the fused deposition modeling 3D printer to carry out the method according to the first aspect.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
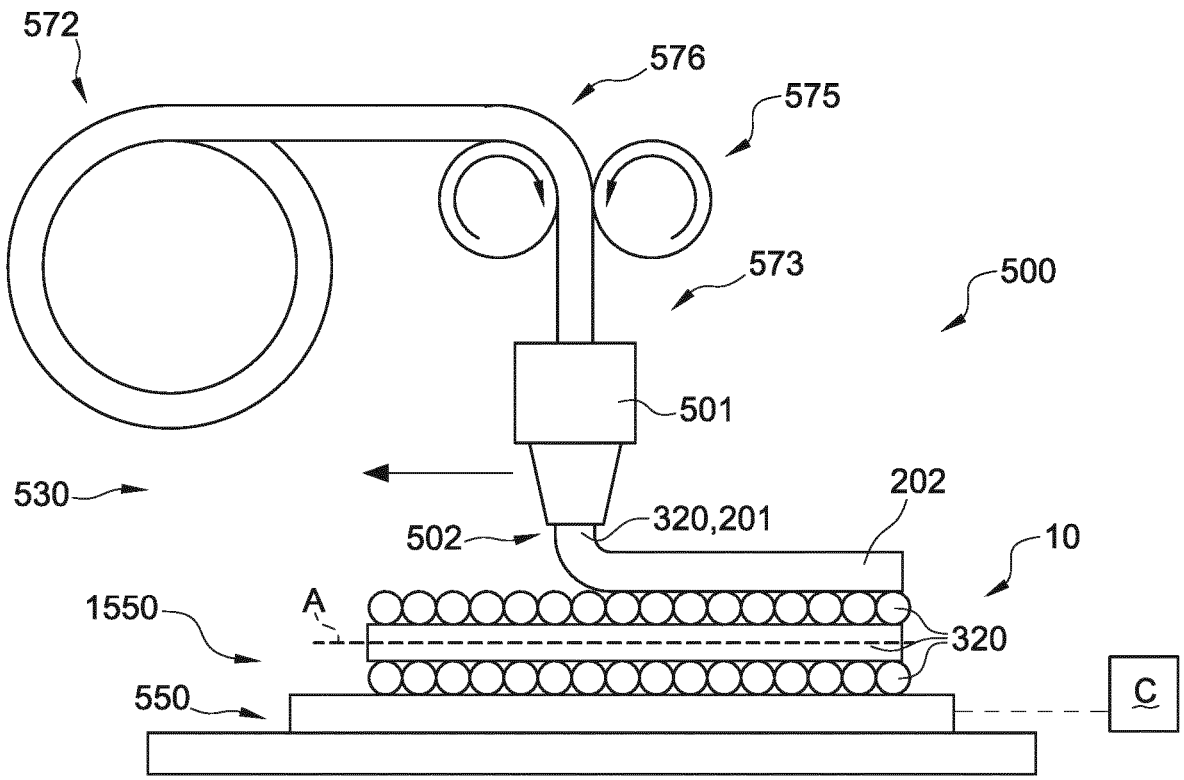
FIGS. 1a-1b schematically depict some general aspects of the 3D printer.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below).

The 3D printer 500 is configured to generate a 3D item 10 by depositing on a receiver item 550, which may in embodiments at least temporarily be cooled, a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater.

Reference 201 indicates printable material. When deposited, this material is indicated as (3D) printed material, which is indicated with reference 202.

Reference 572 indicates a spool or roller with material, especially in the form of a wire. The 3D printer 500 transforms this in a filament or fiber 320 on the receiver item or on already deposited printed material. In general, the diameter of the filament downstream of the nozzle is reduced relative to the diameter of the filament upstream of the printer head. Hence, the printer nozzle is sometimes (also) indicated as extruder nozzle. Arranging filament by filament and filament on filament, a 3D item 10 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Figure 1B:
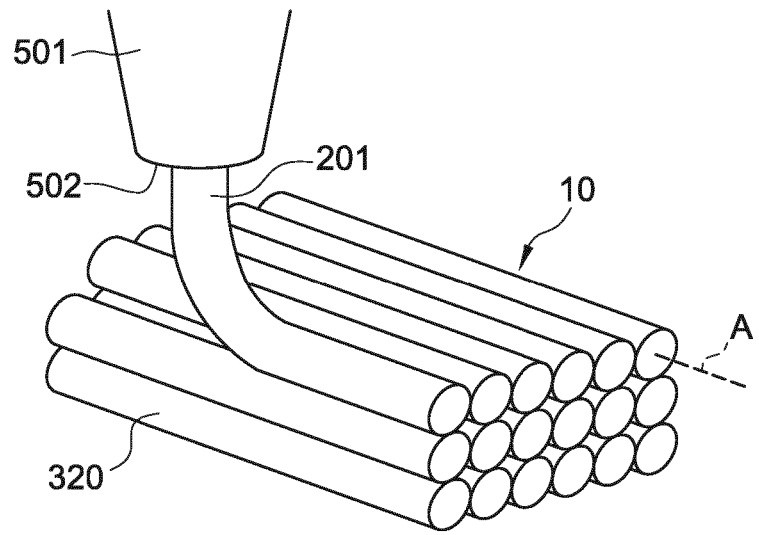

FIG. 1b schematically depicts in 3D in more detail the printing of the 3D item 10 under construction. Here, in this schematic drawing the ends of the filaments 320 in a single plane are not interconnected, though in reality this may in embodiments be the case.

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 320 comprising 3D printable material 201 to the first printer head 501, and optionally (c) a receiver item 550. In FIGS. 1a-1b, the first or second printable material or the first or second printed material are indicated with the general indications printable material 201 and printed material 202.

Here we suggest a method printing continuous solid filaments such as fibers optics, carbon fiber, conductive wires using a FDM printer where the printer head moves in XY plane while the platform moves in the Z direction and a feeder is used to push a polymer to the printer head where the polymer melts and flows out the nozzle. In such a printer the solid filament can be fed into the nozzle together with the polymer as described in FIGS. 2, 3 and 4.

Figure 2:
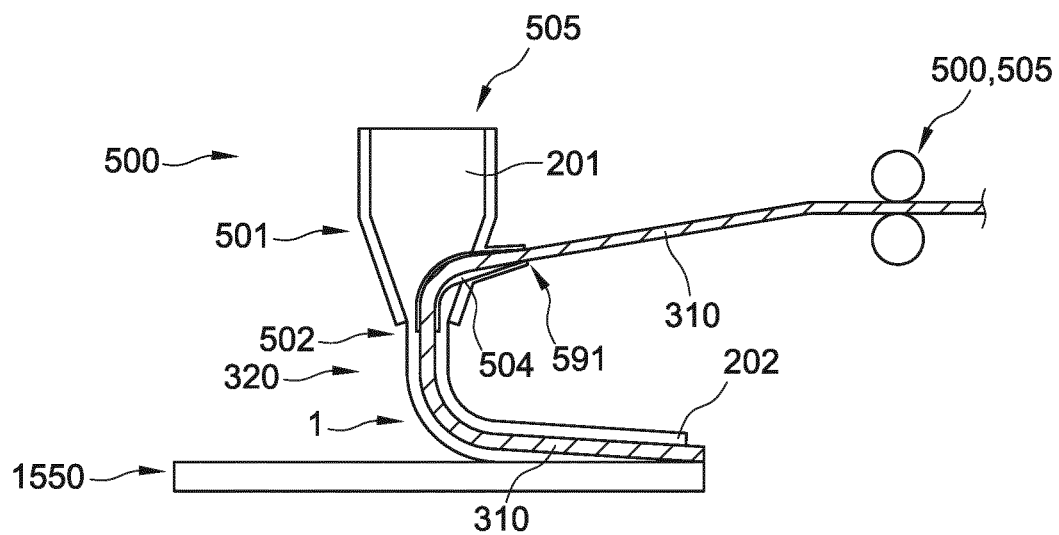
FIGS. 2-5 schematically depict some embodiments of the 3D printer.
Figure 3:
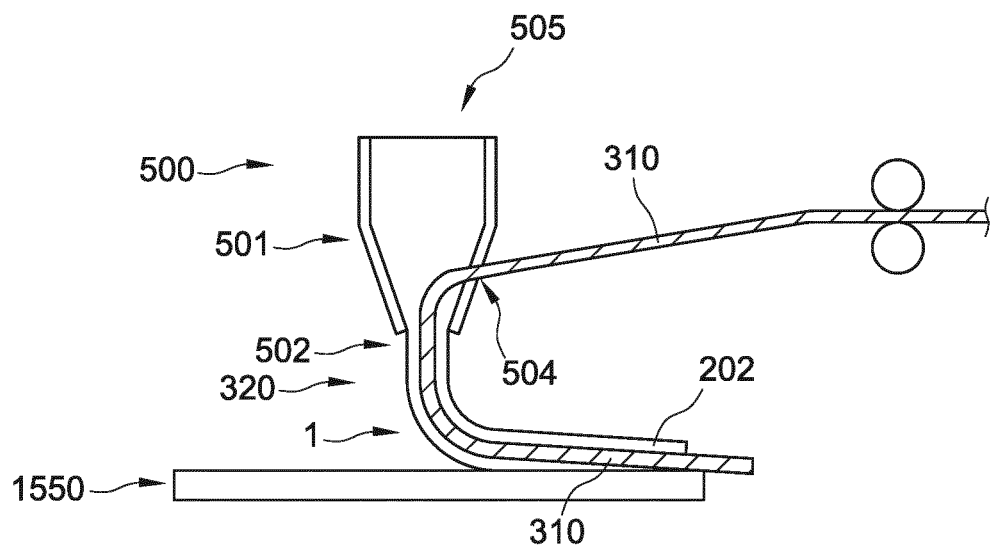

FIGS. 2-3 schematically embodiments of a fused deposition modeling 3D printer, more especially a printer head 501 comprising a printer nozzle 502. The embodiment schematically shown in FIG. 2 may have an advantage of avoiding flow of the polymer from the inlet 504. A 3D printable material providing device configured to provide 3D printable material 201 to the printer head 501 is not depicted, but see e.g. FIG. 1a.

The fused deposition modeling 3D printer 500 is configured to provide said 3D printable material 201 to a substrate 1550. The fused deposition modeling 3D printer 500 further comprises a fiber providing unit 580 for providing an elongated solid fiber 310 to the printer head 501, for instance with a feeder 585.

As shown, in these figures the fused deposition modeling 3D printer 500 is configured to co-deposit during a printing stage 3D printable material 201 and the elongated solid fiber 310 via a single nozzle 502. Further, the fiber providing unit 580 is further configured to introduce the elongated solid fiber 310 via a side inlet 504 of the printer head 501 to the printer nozzle 502. The 3D printable material providing device (not depicted, but see FIG. 1a) is configured to provide the 3D printable material 201 to a top inlet 505 of the printer head 501. Reference 591 indicates a side guide tube.

Reference 222 indicates a deposited layer (the result of depositing filament 320.

Figure 4:
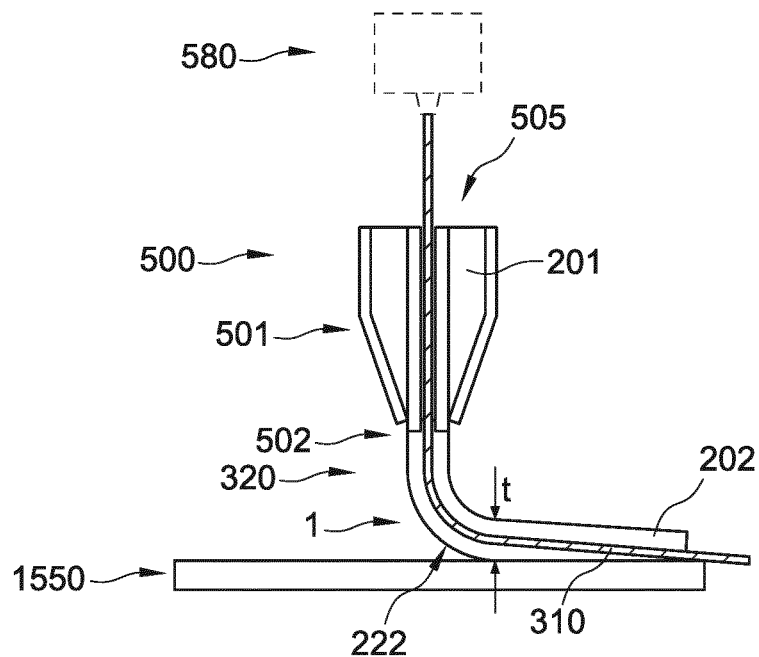

FIG. 4 schematically depicts an embodiment of a fused deposition modeling 3D printer 500, comprising a printer head 501 comprising a printer nozzle 502, and a 3D printable material providing device 575 configured to provide 3D printable material 201 to the printer head 501, wherein the fused deposition modeling 3D printer 500 is configured to provide said 3D printable material 201 to a substrate 1550, wherein the fused deposition modeling 3D printer 500 further comprises a fiber providing unit 580 (see e.g. FIG. 1a) for providing an elongated solid fiber 310 to the printer head 501, wherein the fused deposition modeling 3D printer 500 is configured to co-deposit during a printing stage 3D printable material 201 and the elongated solid fiber 310 via a single nozzle 502, wherein the fiber providing unit 580 is further configured to introduce the elongated solid fiber 310 via top inlet 505 of the printer head 501 to the printer nozzle 502, and wherein 3D printable material providing device 575 is configured to provide the 3D printable material 201 to a top inlet 505 of the printer head 501.

Reference t indicates a layer height of the deposited layer 222.

The platform or substrate 1550 may be heated during the printing stage.

We also found that during the printing the solid filament becomes twisted.

Figure 5:
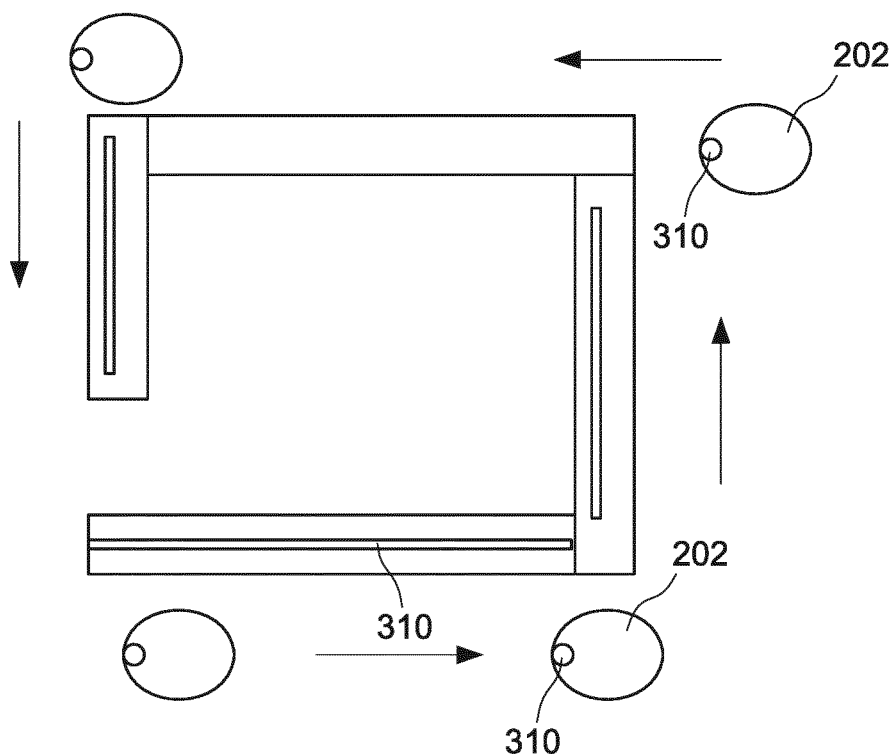

This is best illustrated in FIG. 5 which very schematically shows laying down the solid filament in a square form. The round figures indicate the cross section of the filament. It can be seen that at the corners where the direction of movement changes 90° twist is induced in the filament.

We surprisingly found that when "thin" (<0.5 mm) filaments were used the stress caused by twisting action could be absorbed and printing of the solid filament could be realized together with the polymer. Furthermore at this thickness the filament could be pulled without a need for an external feeder.

When "thick" solid filaments are used >(0.5 mm) then we suggest using a printer with a separate feeder for the filament. We further suggest using a mechanism for rotating the solid filament carrier (reel) in a synchronized manner with the movement of the printer head in order to avoid/reduce the twisting of the filament during printing. This is schematically shown in FIG. 6.

Figure 6:
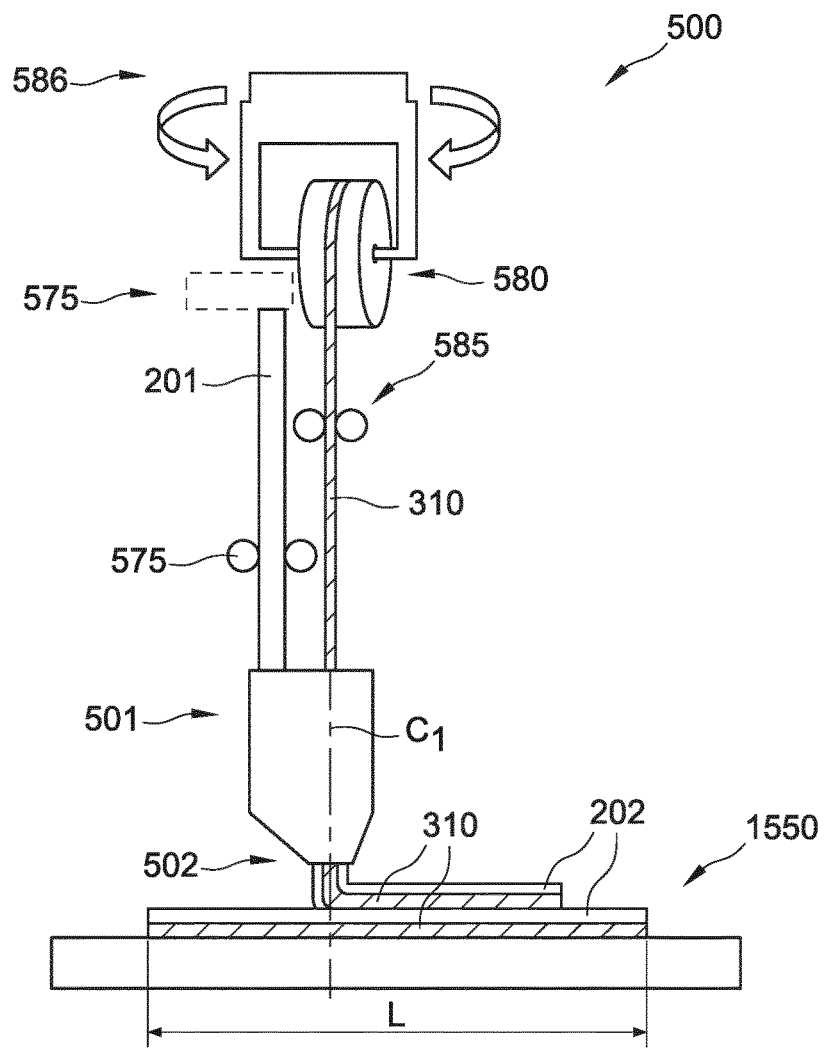
FIG. 6 schematically depicts an embodiment of (part of) a 3D printer.

FIG. 6 schematically depicts an embodiment of a fused deposition modeling 3D printer 500, comprising a printer head 501 comprising a printer nozzle 502, and a 3D printable material providing device 575 configured to provide 3D printable material 201 to the printer head 501. The fused deposition modeling 3D printer 500 is configured to provide said 3D printable material 201 to a substrate 1550. The fused deposition modeling 3D printer 500 further comprises a fiber providing unit 580 for providing an elongated solid fiber 310 to the printer head 501. The fused deposition modeling 3D printer 500 is configured to co-deposit during a printing stage 3D printable material 201 and the elongated solid fiber 310 via a single nozzle 502. The fiber providing unit 580 is further configured to control a rotation of the elongated solid fiber 310 provided to the printer nozzle 502 around an axis C1 of elongation of the elongated solid fiber 310. Reference 585 indicates a solid fiber feeder. Reference 586 schematically depicts an embodiment of a mechanism for rotating the fiber 310. Examples of rotation options are indicate with the arrows.

Eventually a cutter can be included for cutting the filament at desired places. Furthermore during printing at sections where no filament is desired a break can be used to stop the filament pulled out by the viscous action of the flowing polymer.

It was also found that the height of the deposited layers (t) needed to be preferentially 1.5 times larger than the filament diameter (d) (t>1.5d). The width (w) of the deposited filament was found to be preferentially lager than 2 times of the diameter of the filament (w>2d).

Figure 7:
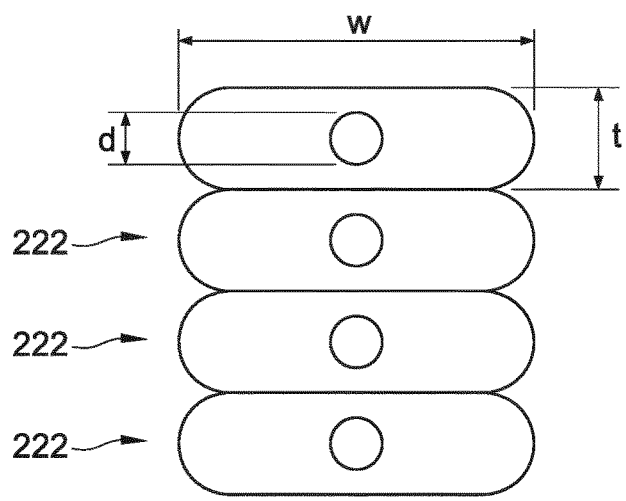
FIG. 7 schematically depicts some aspects of a deposited filament ("layer").

FIG. 7 schematically depicts the four deposited layers, each by way of example include a solid fiber 310, of which two or more may be interconnected (not visible).

It goes without saying that it is possible to use multiple feeders for polymers so that during printing polymers various polymers can be used.

Amongst others, a cylinder was produced with a continuous copper wire with a thickness 0.3 mm in a polycarbonate matrix. Such device may e.g. be used for decorative purposes, but also for magnetic and/or electric applications.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware.

The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for 3D printing a 3D item using a fused deposition modeling 3D printer, wherein the method comprises the steps of:
    feeding by a feeder unit, a 3D printable material to a printer nozzle of the fused deposition modeling 3D printer, wherein the printer nozzle is comprised in a printer head,
    providing, with a fiber providing unit, an elongated solid fiber to the printer nozzle, wherein said fiber providing unit is separate from the feeder unit, and
    co-depositing, during a printing stage, the 3D printable material and the elongated solid fiber via the printer nozzle to provide the 3D item comprising 3D printed material with the elongated solid fiber embedded therein,
    wherein the printer head makes at least one turn during the printing stage,
    wherein the fiber providing unit is further configured to affect a reduction in rotation of the elongated solid fiber around an axis of elongation of the elongated solid fiber to reduce twisting of the elongated solid fiber which occurs as a result of the printer head making said turns during said printing stage,
    wherein the reduction in rotation occurring on the elongated solid fiber before it is provided to the printer head, and
    wherein the elongated solid fiber has a diameter d of at least 0.5 mm.

2. The method according to claim 1, wherein the method further comprises controlling during deposition a layer height of the 3D printed material at at least 1.5*d, and controlling during deposition a layer width of the 3D printed material at at least 2*d, and wherein the elongated solid fiber has a length of at least 5 cm.

3. The method according to claim 1, wherein the elongated solid fiber comprises an electrically conductive material.

4. The method according to claim 1, wherein the elongated solid fiber comprises a light guide material.

5. The method according to claim 1, wherein the elongated solid fiber comprises a glass material.

6. The method of claim 1 wherein the fiber providing unit is further configured to reduce torque that occurs in the elongated solid fiber when the printer head makes turns during the printing stage.

* * * * *